United States Patent [19]

Sirrenberg et al.

[11] 3,905,957

[45] Sept. 16, 1975

[54] 3-ARYL-5-OXO-2-PYRAZOLINE-4-CARBOXANILIDES AND PROCESS THEREFOR

[75] Inventors: Walter Sirrenberg, Ingelheim am Rhein; Rudolf Bauer, Wiesbaden; Werner Schulz; Rolf Banholzer, both of Ingelheim am Rhein, all of Germany

[73] Assignee: Boehringer Ingelheim GmbH, Ingelheim am Rhein, Germany

[22] Filed: Mar. 22, 1972

[21] Appl. No.: 236,987

[30] Foreign Application Priority Data

Mar. 27, 1971 Germany............................ 2114893

[52] U.S. Cl. .. 260/239 D; 260/243 AB; 260/274 R; 260/455 R; 260/583 EE; 424/244; 424/247; 424/248

[51] Int. Cl.² ............... C07D 223/22; C07D 265/38; C07D 279/22

[58] Field of Search ................................ 260/239 D

[56] References Cited
UNITED STATES PATENTS 2,948,732   8/1960   Schindler et al................ 260/239 D

FOREIGN PATENTS OR APPLICATIONS 94,784   11/1962   Denmark........................ 260/239 D Primary Examiner—Alton D. Rollins
Attorney, Agent, or Firm—Hammond & Littell

[57]         ABSTRACT

Novel products selected from the group consisting of compounds of the formula

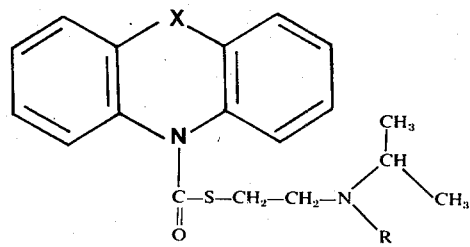

wherein X is selected from the group consisting of ethylene, vinylene, oxygen and sulfur and R is alkyl of 1 to 4 carbon atoms, non-toxic, pharmaceutically acceptable acid addition salts and quaternary ammonium salts thereof having spasmolytic activity and their preparation.

7 Claims, No Drawings

3-ARYL-5-OXO-2-PYRAZOLINE-4-CARBOXANILIDES AND PROCESS THEREFOR

OBJECTS OF THE INVENTION

It is an object of the invention to provide the novel compounds of formula I, their acid addition salts and their quaternary ammonium salts.

It is another object of the invention to provide novel processes for the preparation of the compounds of formula I.

It is an additional object of the invention to provide novel spasmolytic compositions and a novel method of inducing anti-spasmodic activity in warm-blooded animals.

These and other objects and advantages of the invention will become obvious from the following detailed description.

THE INVENTION

The novel products of the invention are selected from the group consisting of compounds of the formula

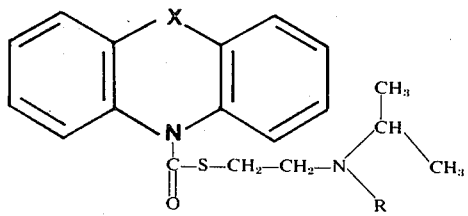

wherein X is selected from the group consisting of ethylene, vinylene, oxygen and sulfur and R is alkyl of 1 to 4 carbon atoms, non-toxic, pharmaceutically acceptable acid addition salts and quaternary ammonium salts thereof.

Examples of suitable acids for the non-toxic, pharmaceutically acceptable acid addition salts are inorganic acids such as hydrohalic acids, sulfuric acid, phosphoric acid, nitric acid, etc. and organic acids such as oxalic acid, citric acid, tartaric acid, fumaric acid, maleic acid, acetic acid, propionic acid, succinic acid, methanesulfonic acid, etc.

Examples of suitable quaternazation agents for the quaternary ammonium derivatives of the compounds of formula I are halo loweralkylates such as bromomethylate, bromoethylate, etc.; lower alkyl sulfuric acid and sulfonic acid esters such as methanesulfonic acid.

A process of the invention for the preparation of a compound of formula I comprises reacting a compound of the formula

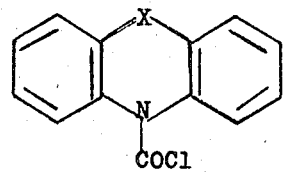

with a mercaptan of the formula

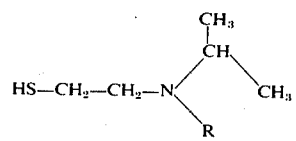

or an alkali metal salt thereof in an organic solvent in the presence of an acid acceptor as described in Houben-Weyl, Methoden der Organischen Chemie [4th Ed., Vol. 9 (1955), p. 835].

Suitable organic solvents are benzene, toluene, xylene, methylene chloride, dioxane, pyridine, quinoline or triethylamine. Suitable acid acceptors are tertiary amines which may also act as solvent, sodium hydroxide, sodium carbonate, potassium carbonate or sodium alcoholate.

Another method of producing the compounds of formula I comprises reacting an amine compound of the formula

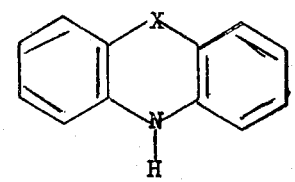

wherein X has the above definition or the alkali metal salts thereof with a compound of the formula

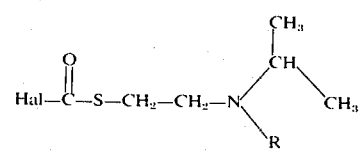

wherein R is as above and Hal is a halogen in an organic solvent with an acid acceptor of the type discussed previously.

A third method of preparing the compounds of formula I comprises reacting a compound of the formula

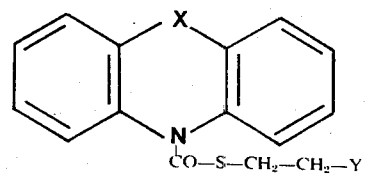

wherein X has the above definition and Y is selected from the group consisting of halogen, alkyl, aryl or aralkylsulfonic acid ester with an amine of the formula

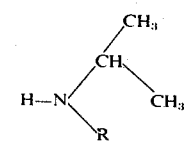

wherein R is as above or its alkali metal salts in an organic solvent in the presence of an acid acceptor as discussed above.

A fourth method of preparing the compound of formula I comprises reacting a salt of a thiolcarbamidic acid of the formula

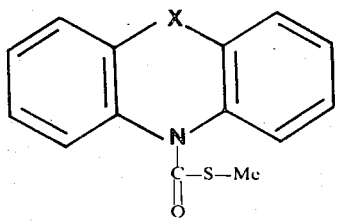

VIII wherein X is as above and Me is an alkali metal with a compound of the formula

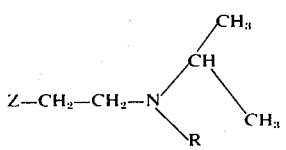

IX wherein R is as above and Z is halogen or an alkyl, aryl or aralkylsulfonic acid group in an organic solvent as discussed above in the presence of a strong base such as sodium, sodium amide and sodium alcoholate.

The acid addition salts and quaternary ammonium compounds may be made by known procedures.

The compounds of formula II are partly novel and may be produced by known processes as described in Houben-Weyl, [Methoden der Organischen Chemie, 4th edition, Vol. 8, page 117 (1952)]. The basically substituted mercaptans of formula III are partially novel as well and may be produced by known processes such as by reacting the corresponding amines with ethylene sulfide as described by B. Hansen, [Acta chem. scand. Vol. 13., 151 (1959)], or from dialkylaminoethylisothiuronium chloride hydrochlorides by hydrolysis according to N. F. Albertson and R. O. Clinton, [J. Am. Chem. Soc., Vol. 67, 1223 (1945)]. The compounds of formula VI are obtained in a known way by reacting an amine of formula IV with phosgene, subsequent reaction with a mercaptan of the formula $HSCH_2—CH_2OH$ and, finally, esterification with a reactive acid of formula HY, wherein Y has the above meaning. The compound of formula VIII may be obtained by reacting an amine of formula IV with an alkali metal and subsequently with carbonoxysulfide in a known way as described in Houben-Weyl, [ 4th edition, Vol. 9, page 823–826 (1955)].

The novel spasmolytic compositions of the invention are comprised of an effective amount of a compound of formula I or its non-toxic, pharmaceutically acceptable acid addition salts or quaternary ammonium salts and a pharmaceutical carrier. The usual individual dose 1 to 300 mg, preferably 5 to 50 mg. The compositions may also contain other pharmaceuticals such as hypnotics or tranquilizers.

The compositions may be in the form of tablets, capsules, suppositories, solutions, emulsions, or dispersible powders. Tablets, for example, may be obtained by mixing the active ingredient or ingredients with known excipients such as inert diluents like calcium carbonate, calcium phosphate or lactose, disintegrants like corn starch or alginic acid, binders like starch or gelatin, lubricants like magnesium stearate or talcum and/or agents for sustained release like carboxypolymethylene, carboxymethylcellulose, celluloseacetatephthalate, or polyvinylacetate. The tablets may also consist of several layers.

The correspondingly coated tablets can be prepared by coating cores — prepared analogous to the tablets — with agents usually employed for tablet-coats, for example polyvinylpyrrolidone or shellac, gum arabic, talcum, titanium dioxide or sugar. To obtain sustained release or to avoid incompatibilities, the core may consist of several layer as well. The tablet-coat also may consist of several layers to obtain sustained release whereby the excipients mentioned above for the tablets may be used.

Juices or solutions of the active ingredients of the invention may contain additionally a sweetener such as saccharin, cyclamate, glycerin or sugar, as well as an agent for improving the taste such as flavors such as vanillin or orange extract. Moreover, they may contain suspension agents or thickeners such as sodium carboxymethylcellulose, wetting agents such as condensation products of fatty alcohols with ethylene oxide, or preservatives such as p-hydroxybenzoates.

Capsules containing one or several active ingredients may be produced by mixing the active ingredients with inert carriers such as lactose or sorbitol and filling the mixture into gelatin capsules. Suitable suppositories may be produced by mixing with carriers such as neutral fats or polyethyleneglycol or the derivatives thereof as discussed above.

The compositions of the invention have excellent spasmolytic activity and have the further advantage of having lower toxicity and reduced side-effects such as mydriasis, tachycardis and saliva-secretion inhibiting properties possessed by known spasmolytics and therefore have a greater therapeutic index.

The novel method of preventing spasms in warm-blooded animals comprises administering to warm-blooded animals a spasmolytically effective amount of a compound of formula I or its non-toxic, pharmaceutically acceptable acid addition salts or quaternary ammonium salts. The said products may be administered orally, rectally or transcutaneously and the usual daily dose is 0.1 to 100 mg/kg depending upon the method of administration and the specific compound. The preferred compounds are those of formula I where X is ethylene or vinylene. The most preferred compound is the (β-ethylisopropylamino-ethyl)-thioester of iminodibenzyl-carbamidic acid.

In the following examples there are described several preferred embodiments to illustrate the invention. However, it is to be understood that the invention is not intended to be limited to the specific embodiments.

EXAMPLE I

A solution of 44.1 g (0.3 mol) of ethylisopropylamino-ethanethiol and 30.3 g (0.3 mol) of triethylamine in 90 ml of toluene was added over 30 minutes dropwise with stirring to a refluxing solution of 77.4 g (0.3 mol) of iminodibenzylcarbamidic acid chloride in 210 ml of toluene and the resulting mixture was refluxed for 3 hours. After ccooling, the mixture was vacuum filtered and the toluene phase was extracted three times with 250 ml aliquots of an aqueous solution buffered at a pH of 2. Then, the organic phase was extracted three times with 100 ml aliquots of 2 N methanesulfonic acid. The acid solution was made alkaline by the addition of a sodium hydroxide solution while cooling and was then extracted three times with 200 ml aliquots of dichloromethane. The organic phase was washed with water, dried over anhydrous sodium sulfate and evaporated to dryness in vacuo. The residue of 98.8 g (88.6% yield) in the form of a light-yellow oil slowly crystallized to obtain the ($\beta$-ethylisopropylaminoethyl)thioester of iminodibenzyl-carbamidic acid melting at 76°–78°C. Treatment of the said ester with hydrochloric acid resulted in the formation of the hydrochloride salt thereof melting at 224°–227°C.

EXAMPLE II

Using the procedure of Example I, iminodibenzyl-carbamidic acid chloride and $\beta$-diisopropylaminoethanethiol were reacted to form the hydrochloride of the ($\beta$-diisopropylaminoethyl)-thioester of iminodibenzyl-carbamidic acid melting at 206°–208°C.

EXAMPLE III

Using the procedure of Example I, iminodibenzyl-carbamidic acid chloride and $\beta$-methyl-isopropylamino-ethanethiol were reacted to form the hydrochloride of the ($\beta$-methyl-isopropylamino-ethyl)-thioester of iminodibenzyl-carbamidic acid melting at 215°–217°C.

EXAMPLE IV

Using the procedure of Example I, iminostilbene-carbamidic acid chloride and $\beta$-diisopropylaminoethanethiol were reacted to obtain the hydrochloride of the ($\beta$-diisopropylaminoethyl)-thioester of iminostilbene-carbamidic acid melting at 203°–205°C.

EXAMPLE V

Using the procedure of Example I, phenothiazinecarbamidic acid chloride and diisopropylaminoethanethiol were reacted to obtain the hydrochloride of the ($\beta$-diisopropylaminoethyl)-thioester of phenothiazine-carbamidic acid melting at 198°–200°C.

EXAMPLE VI

Using the procedure of Example I, phenothiazinecarbamidic acid chloride and $\beta$-ethylisopropylamino-ethanethiol were reacted to form the hydrochloride of the ($\beta$-ethylisopropylamino-ethyl)-thioester of phenothiazine-carbamidic acid melting at 210°–212°C.

EXAMPLE VII

Using the procedure of Example I, phenoxazine-carbamidic acid chloride and $\beta$-diisopropylamino-ethanethiol were reacted to form the hydrochloride of the ($\beta$-diisopropylaminoethyl)-thioester of phenoxazine-carbamidic acid melting at 217°–219°C.

EXAMPLE VIII

Using the procedure of Example I, phenoxazine-carbamidic acid chloride and $\beta$-ethylisopropylamino-ethanethiol were reacted to form the hydrochloride of the ($\beta$-ethylisopropylamino-ethyl)-thioester of phenoxazine-carbamidic acid melting at 208°–210°C.

EXAMPLE IX

A mixture of 7.4 g (0.02 mol) of the ($\beta$-ethylisopropylamino-ethyl)-thioester of iminodibenzyl-carbamidic acid and 9.5 g (0.1 mol) of methylbromide in 50 ml of acetonitrile was allowed to stand at room temperature for 3 days and the reaction mixture was evaporated to dryness in vacuo to obtain 9.0 g (97% yield) of the bromomethylate of the ($\beta$-ethylisopropylamino-ethyl)-thioester of iminodibenzyl-carbamidic acid in the form of crystals melting at 204°–205°C.

EXAMPLE X

Using the procedure of Example IX, methylbromide and the ($\beta$-diisopropylamino-ethyl)-thioester of iminodibenzylcarbamidic acid were reacted to form the bromomethylate of the ($\beta$-diisopropylamino-ethyl)-thioester of iminodibenzylcarbamidic acid melting at 205°–207°C.

EXAMPLE XI

Using the procedure of Example IX, methylbromide and the ($\beta$-diisopropylamino-ethyl)-thioester of iminostilbene-carbamidic acid were reacted to form the bromomethylate of the said ester melting at 225°–227°C.

EXAMPLE XII

Using the procedure of Example IX, methylbromide and the ($\beta$-diisopropylamino-ethyl)-thioester of phenothiazinecarbamidic acid were reacted to form the corresponding bromomethylate of the said ester melting at 205°–207°C.

EXAMPLE XIII

Using the procedure of Exammple IX, methylbromide and the ($\beta$diisopropylamino-ethyl)-thioester of phenoxazinecarbamidic acid were reacted to form the bromomethylate of the said ester melting at 207°–208°C.

EXAMPLE XIV

A mixture of 14.7 g (0.1 mol) of $\beta$-ethylispropylamino-ethanethiol and 13.8 g (0.1 mol) of anhydrous potassium carbonate in 100 ml of toluene was refluxed under a nitrogen atmosphere and after the dropwise addition of a solution of 24.75 g (0.1 mol) of iminodibenzyl-carbamidic acid chloride in 100 ml of toluene, the mixture was refluxed for 10 hours. After cooling, the mixture was filtered and the filtrate was extracted 3 times with aqueous 2 N methanesulfonic acid. The aqueous solution was cooled and made alkaline with sodium hydroxide solution. The aqueous phase was extracted three times with chloroform and the chloroform phase was dried and evaporated to obtain oily ($\beta$-ethylisopropylamino-ethyl)-thioester of imonodibenzyl-carbamidic acid which slowly crystallized into a solid melting at 76°–78°C. The hydrochloride salt melting at 224°–227°C was prepared in the usual manner.

EXAMPLE XV

A mixture of 14.7 g (0.1 mol) of $\beta$-ethylisopropylamino-ethanethiol and 5.4 g (0.1 mol) of sodium methylate in 200 ml of anhydrous methanol was refluxed for 1 hour under a nitrogen atmosphere and then the solvent was evaporated off. A mixture of 24.75 g (0.1 mol) of iminodibenzyl-carbamidic acid chloride in 320 ml of anhydrous toluene was added to the residue and the mixture was refluxed for 10 hours under a nitrogen atmosphere. After cooling, the organic solution was extracted 3 times with aqueous solution buffered at a pH of 2 and then 3 times with aqueous 2 N methanesulfonic acid. The methanesulfonic acid phase was made alkaline and then extracted with chloroform. The chloroform phase was dried and evaporated to dryness to obtain 28 g (75.8% yield) of the (β-ethylisopropylamino-ethyl)-thioester of iminodibenzyl-carbamidic acid identical to that of Example XIV.

PHARMACEUTICAL EXAMPLES

EXAMPLE A — COATED TABLETS

A mixture of 10.0 g of the hydrochloride of (β-ethylisopropylamino-ethyl)-thioester of iminodibenzyl-carbamidic acid, 57.0 g of lactose and 30.0 g of corn starch was granulated with a 10% aqueous solution of 2.0 g of gelatin through a screen of 1 mm mesh and was dried at 40°C and passed again through the screen. The resulting granulate was admixed with 1.0 g of magnesium stearate and was pressed into cores of 100 mg each. The said cores were conventionally coated with an aqueous suspension of sugar, titanium dioxide, talc and gum arabic and the finished tablets were coated with beeswax to obtain tablets weighing 150 mg and containing 10.0 mg of active ingredient.

EXAMPLE B — TABLETS 16 g of the hydrochloride of the (β-diisopropylaminoethyl)-thioester of iminostilbene-carbamidic acid and 2 g of magnesium stearate were granulated with an aqueous solution of 8 g of soluble starch and then the granulate was dried and throughly admixed with 90 g of lactose and 64 g of corn starch. The mixture was pressed into tablets weighing 180 mg and containing 16 mg of active ingredient.

EXAMPLE C — SUPPOSITORIES 30 g of finely pulverized hydrochloride of the (β-diisopropylamino-ethyl)-thioester of iminostilbene-carbamidic acid were stirred into 1670 g of molten suppository base cooled to 40°C with an immersion homogenizer and the mass was poured at 35°C into slightly precooled molds to obtain suppositories weighing 1,700 mg and containing 30 mg of active ingredient.

EXAMPLE D — AMPOULES 0.5 g of the hydrochloride of the (β-diisopropylamino-ethyl)-thioester of phenoxazine-carbamidic acid and 18.0 g of sodium chloride were dissolved in 2 g of boiled, twice distilled water and the resulting solution was filtered free of suspended particles and filled into 2 ml ampoules under aseptic conditions. The ampoules were sterilized and sealed to obtain ampoules containing 0.5 mg of active ingredient.

Various modifications of the compositions and method of the invention may be made without departing from the spirit or scope thereof and it should be understood that the invention is intended to be limited only as defined in the appended claims.

We claim:

1. A compound selected from the group consisting of compounds of the formula

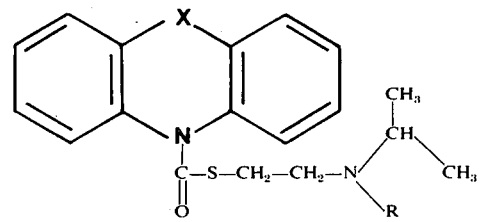

wherein X is selected from the group consisting of ethylene and vinylene and R is alkyl of 1 to 4 carbon atoms, non-toxic, pharmaceutically acceptable acid addition salts and lower alkyl quaternary ammonium salts thereof.

2. A compound of claim 1 wherein X is ethylene.

3. A compound of claim 1 wherein X is vinylene.

4. A compound selected from the group consisting of the (β-ethylisopropylamino-ethyl)-thioester of iminodibenzylcarbamidic acid and its non-toxic, pharmaceutically acceptable acid addition salts and its lower alkyl quaternary ammonium salts.

5. A compound selected from the group consisting of the (β-diisopropylamino-ethyl)-thioester of iminostilbenecarbamidic acid and its non-toxic, pharmaceutically acceptable acid addition salts and its lower alkyl quaternary ammonium salts.

6. A compound of claim 1 selected from the group consisting of (β-methyl-isopropylamino-ethyl)-thioester of iminodibenzyl-carbamidic acid, its non-toxic, pharmaceutically acceptable acid addition salts and its lower alkyl quaternary ammonium salts.

7. A compound of claim 1 selected from the group consisting of (β-diisopropylamino-ethyl)-thioester of iminodibenzyl-carbamidic acid, its non-toxic, pharmaceutically acceptable acid addition salts and its lower alkyl quaternary ammonium salts.

* * * * *